United States Patent Office 3,505,088
Patented Apr. 7, 1970

3,505,088
PROCESS FOR THE MANUFACTURE OF A TITANIUM DIOXIDE PIGMENT FOR THE DELUSTERING OF POLYAMIDE FIBERS
Hans-Hermann Luginsland, Opladen, Gerhard Rieck, Leverkusen, and Helmut Weber, Odenthal-Osenau, Germany, assignors to Titangesellschaft m.b.H., Leverkusen, Germany, a corporation of Germany
No Drawing. Filed Aug. 2, 1966, Ser. No. 569,571
Claims priority, application Germany, Aug. 5, 1965,
T 29,162
Int. Cl. C09c 1/36
U.S. Cl. 106—308       7 Claims

ABSTRACT OF THE DISCLOSURE

Process for the manufacture of an improved titanium dioxide suitable for use as a delusterant in polyamide fibers is disclosed. The process is characterized by subjecting a titanium dioxide pigment, manufactured in any desired manner, to post-treatment with a water-soluble manganese (II) salt and orthophosphoric acid or a water-soluble orthophosphate and one or more other hydrated oxides that are non-colored and difficultly soluble or other non-colored and difficultly soluble compounds formed by water-soluble metal salts and/or a water soluble silicate.

---

The present invention relates in general to delustered synthetic fibers and more particularly to an improved titanium dioxide pigment and method for producing same suitable for use as a delusterant in polyamide fibers.

Fabrics of semi- and fully synthetic fibers have, as is well known, an unattractive fatty gloss and are more or less strongly transparents especially in the wet state. In order to remedy these shortcomings, titanium dioxide pigment has been added to the fiber material prior to spinning. This procedure is known as spin-delustering.

Unfortunately, however, the resistance of certain synthetic fibers to the deleterious effects of light is strongly impaired by this delustering process due to the fact that the titanium dioxide catalyzes photochemical reactions between the atmospheric oxygen and the synthetic fibers. The mechanical characteristics of the fibers, e.g., extensibility and tearing strength, are strongly impaired by the effect of light and this is particularly true of polyamide fibers.

Numerous experiments have been made in the past with the aim of reducing the photoreactivity of the titanium dioxide pigment, be by the application of special treating agents to the hydrous $TiO_2$ prior to calcination or by a post-treatment of the $TiO_2$ pigment with various compounds. It is, for example, known to add antimony compounds to hydrous $TiO_2$ prior to calcination. This achieves indeed, certain improvements in the pigment but in most cases the pigment is still not adequate as a delusterant for polyamide fibers; nor has the post-treatment of the calcined pigment with silicic acid, hydrated aluminum oxide or other colorless compounds been particularly successful.

On the other hand, it is well known that it is possible to improve the resistance to light of $TiO_2$ delustered polyamide fibers by adding manganese compounds to the solution of the monomers used in the manufacture of the polyamide fibers. In such instances the addition of the manganese compounds is made prior to the addition of the titanium dioxide pigment and consequently separate dosing devices are necessary for the addition of the manganese compounds. Moreover, optimum stabilizing effect is not always obtained in as much as the manganese compounds do not come sufficiently in contact with the titanium dioxide pigment, and further, the manganese compounds, like most electrolytes, have a strong flocculating effect on the titanium dioxide pigment and hence the delustering effect of the $TiO_2$ is minimized while the coarse titanium dioxide agglomerates cause difficulties in the spinning process later on. An additional disadvantage of these earlier methods is that many manganese compounds have a strong color of their own so that only small amounts may be added to the monomer solutions. Also discoloration is sometimes produced due to oxidation of the manganese compounds used. In order to remedy the last-named disadvantage it has been suggested that manganese be employed in the form of soluble polyphosphate complexes (German application No. 1,063,378) but this has not remedied the other disadvantages caused by the separate addition of the manganese compound. Incidentally the polyphosphate complexes have to be prepared separately, or in those cases where the polyphosphate complexes are to be formed within the solution, then two separate dosing devices have to be provided, one for the manganese compound and one for the polyphosphate. Moreover relatively large amounts of soluble phosphorous compounds get into the polyamide which may lead to an impairment of the product. In this connection following spinning the spun fibers must frequently be post-treated at high temperatures, which gives rise to discoloration of the fibers. This can be remedied by a subsequent bleaching process but herein an additional disadvantage of the prior art processes becomes apparent. In the bleaching process a different discoloration appears caused by the oxidation of the manganese compound and this discoloration must be removed by yet another processing step in which the manganese is again reduced to the divalent form. In these operational steps the tearing strength and stability to light of the fiber are steadily reduced.

In order to avoid these disadvantages it has been suggested that higher amounts of phosphates be added in addition to the manganese compound used for stabilization (French Patent No. 1,375,870). This expedient does avoid discoloration due to bleaching to a certain extent. However, large amounts of soluble phosphorous compounds are introduced into the polyamide as a consequence of which the above-mentioned disadvantages come to the fore again.

According to a process described in the German application 1,107,398 the discoloration produced in bleaching polyamide fibers, may be avoided provided the manganese is used in the form of non-complex phosphates of divalent manganese including the double phosphates with ammonia and/or alkali metals. But again the addition of the manganese compound takes place separately from the addition of the titanium dioxide pigment, with the attendant disadvantages, namely, that separate dosing devices are required and that the manganese compound does not intimately contact the titanium dioxide pigment. A particular disadvantage of this process is that the non-complex manganese phosphates, being difficultly soluble, are used in the solid state only, and this renders it difficult to disperse the phosphates uniformly in the polyamide.

In order to avoid the difficulties attending separate additions of titanium dioxide pigment and the manganese compounds to the monomer solutions the suggestion is made in German Patent 737,943 to mix the titanium dioxide pigment with a particular water-insoluble manganese compound and add the mixture thus prepared immediately to the polyamide condensation mixture. Here the concern is not with a post-calcination treatment as is understood in titanium dioxide manufacture. The manganese may form strongly colored valency states by oxidation; the anions introduced with the manganese salt may lead to an impairment of the polyamide so that under certain conditions only slight amounts of manganese can be added with the pigment; and any additional manganese must be added separately from the pigment.

Additional prior art includes: U.S. Patent 2,206,278 which describes a process in which the titanium dioxide pigment and a water-soluble manganese compound may be added separately to the monomer solution; or the manganese compound precipitated on the pigment prior to the addition thereof to the monomer solution; German application 1,032,526 which describes precipitation of a manganese salt with a reducing anion onto the pigment; and French Patent No. 1,354,557, which discloses a process according to which a titanium dioxide pigment is treated with a manganese salt the manganese being precipitated onto the pigment in the form of manganese dioxide. Various disadvantages are inherent in the foregoing processes. In the process described in French Patent No. 1,354,557 the manganese compound is in the form of a strongly colored manganese dioxide; in the process according to the U.S. Patent No. 2,206,278 there is also a strong possibility that the manganese will be transfomed into strongly colored higher oxides. Even when using very small amounts of manganese compounds, which in themselves are not sufficient for stabilization of the polyamide, discoloration of the polyamide may occur, and under certain conditions it would be necessary to use additional amounts of manganese besides the manganese associated with the pigment. In the process according to German application 1,032,526 the formation of colored manganese compounds of higher valency is avoided but the manganese compounds used here are, in many instances, not particularly stable or are partly loosened from the pigment in the suspension so that they are not fully effective for adequately coating of the titanium dioxide. And further, often the manganese compounds suggested by the prior art cannot be employed economically on a large scale owing to their high cost, as a consequence of which substitutes are used. The pigments thus used and obtained show, therefore, some disadvantages which are not counter-balanced by the alleged advantages of associating the manganese compound with the pigment-as compared with separate additions of the manganese compound and the titanium dioxide pigment to the monomer solutions.

An object therefore of the present invention is to provide improved light-fast titanium dioxide-delustered synthetic fibers and method for producing same. A further object of the invention is to provide an improved titanium dioxide pigment and method for producing same suitable for use as a delusterant in synthetic fibers. A still further object of the invention is to provide a superior method for incorporating a manganese phosphate compound in titanium dioxide-delustered polyamide fibers.

These and other objects, features and advantages of the invention are described in greater detail in the specification which follows.

In general the invention has its concept in the discovery of a new process for the manufacture of an improved titanium dioxide suitable for use as a delusterant in polyamide fibers and is characterized by subjecting a titanium dioxide pigment, manufactured in any desired manner, to post-treatment with a water-soluble manganese (II) salt and orthophosphoric acid or a water-soluble orthophosphate and one or more other hydrated oxides that are non-colored and difficultly soluble or other non-colored and difficultly soluble compounds formed by water-soluble metal salts and/or a water soluble silicate.

The term "titanium dioxide pigment" as used herein will be understood to include a calcined titanium dioxide pigment produced by the well-known sulfate process or a pyrogenic titanium dioxide pigment produced by the major phase reaction of titanium tetrachloride with oxygen.

The post-treatment employed in the present invention is carried out as follows:

A $TiO_2$ pigment manufactured in any desired manner is slurried in water, if needed, with the aid of a dispersing agent and/or alkali, and, as the case may be, subjected to wet milling and/or classification. It is then mixed thoroughly in any desired sequence with a manganese (II) salt and orthophosphoric acid, or a water-soluble orthophosphate, and possibly other anions for the precipitation of water-soluble compounds furnishing metal compounds. The mixture is neutralized after the addition of a part or all of the post-treatment substances and the pigment, treated in such manner, is filtered, washed, dried and milled.

In the process according to the invention manganese (II) orthophosphate is applied to the surface of the titanium dioxide pigment. This shows important advantages compared with prior known processes for applying manganese compounds to titanium pigment. The manganese (II) orthophosphate is practically colorless and very stable. For this reason the danger of oxidation of the manganese to a higher oxidation step thus effecting a discoloration of the polyamide is slight. The pigment post-treated according to the invention is indefinitely stable in the dry state without change of its properties, especially brightness. If necessary, larger amounts of manganese may be applied in this form without likelihood of discoloration of the polyamide. This compound is difficultly soluble in water so that it adheres firmly on the pigment and can be fully active there. In addition, the titanium dioxide pigment thus treated is very easily dispersed in water and also has no tendency toward agglomeration during manufacture of the polyamide. It is noteworthy that none of the published papers mentioned above teaches or describes coating a titanium dioxide pigment with manganese (II) orthophosphate; either alone or in combination with other colorless metal oxides and silica; and in particular by a post-treatment process such as is customarily employed in the manufacture of pigmentary titanium dioxide.

The process according to the invention avoids not only the disadvantages of the separate addition of the titanium dioxide pigment and the manganese compound, respectively, in the process of polyamide manufacture but by using the coated pigment made according to the instant invention titanium dioxide-delustered polyamide fibers are obtained with improved stability against the degredation effects of light. This stability surpasses the stability obtained by the separate addition of the $TiO_2$ pigment, the manganese phosphate and the manganese compound, respectively to the polyamide monomer.

In following the process of this invention no soluble phosphates get into the polyamide. Moreover the addition of polyphosphate complexes is not necessary and no discoloration occurs in the bleaching of a polyamide that may have been discolored by treatment of at elevated temperature. Thus the additional treatment steps which have been necessary heretofore for removal of discoloration produced by bleaching and the impairment of the fiber characteristics connected with it, as well as the disadvantages attending the separate addition to the monomer solution, of the manganese compound and, as the case may be, the soluble phosphate and the titanium dioxide pigment, are avoided. The substances employed for coating of the titanium dioxide pigment with the manganese (II) phosphate are, in addition, relatively low priced so that the process according to the invention may be used on a large scale.

Titanium dioxide pigments suitable for use as a delusterant in polyamide fibers are obtained even if the titanium dioxide pigment is post-treated solely with a water-soluble manganese (II) and phosphoric acid or a water-soluble phosphate. It is, however, particularly expedient to use in the post-treatment, besides the manganese (II) salt and the phosphoric acid or the phosphate, one or more other difficulty soluble hydrated oxides that are colorless on neutralization, or also non-colored and difficultly soluble compounds formed by water-soluble metal salts and/or a water-soluble silicate. In this case it is particularly expedient if the post-treatment is carried out as follows:

The slurried and, as the case may be, wet milled and/or classified titanium dioxide pigment is first mixed with a water-soluble silicate and/or a water-soluble aluminum salt and/or possibly one or more of other suitable metal salts excepting manganese (II) salts and, as the case may be, with additional anions for the precipitation of metal salts from the water-soluble compounds in any desired sequence. Subsequently at least part of the metal compound added and/or the silicate is precipitated by at least partial neutralization on the titanium dioxide pigment in insoluble form. To insure that a sufficient amount of orthophosphate ions are present for the precipitation of the manganese that is to be added later, orthophosphoric acid or a water-soluble orthophosphate is added; finally, the water-soluble manganese (II) salt is added. Subsequently the mixture is again neutralized, if necessary, and the pigment thus treated is filtered, washed, dried and milled.

A particularly suitable titanium dioxide pigment is obtained if the post-treatment is carried out with a water-soluble silicate, a water-soluble aluminum salt, a water-soluble manganese (II) salt and orthophosphoric acid or a water-soluble orthophosphate. By coating the pigment with alumina and silica in addition to manganese (II) phosphate, not only are the optical properties of the pigment improved i.e. brightness and color tone, but also the behavior of the slurry during post-treatment such as, for example, filterability and milling characteristics, are improved. The fact that the manganese (II) salt is added last in the post-treatment has probably the effect that the manganese (II) salt is not directly in contact with the surface of the titanium dioxide pigment but is spaced therefrom by an intermediate layer of previously precipitated hydrated oxides or other compounds. This particular structure of the coated $TiO_2$ pigment may well be the reason for the improvement in its optical properties.

The amount of the manganese salt used in the post-treatment depends on the type of the fiber material to be stabilized and may amount to 0.05 to 2.0% calculated as Mn based on the weight of $TiO_2$ pigment treated. In general, an amount of 0.1% Mn is sufficient but in special cases an amount of 1.0% Mn and higher may become necessary. The other substances used for post-treatment, as the case may be, may be added in the customary amounts. For example, silicate may be added in amounts from 0.0 to 5.0% preferably 0.5 to 1.0%, calculated as $SiO_2$, and aluminum salt in amounts from 0.0 to 5.0%, preferably 0.5 to 2.0%, calculated as $Al_2O_3$; both additions being based on the weight of the $TiO_2$ pigment.

When carrying out the post-treatment, care must be taken that the manganese is completely precipitated as orthophosphate and does not form hydrated oxide in part since this easily causes discoloration by oxidation of the manganese into a higher valency step.

It is especially expedient, for example, to proceed in the following manner:

A titanium dioxide pigment manufactured according to any known process is slurried with water to a concentration of 300–600 $TiO_2$ pre liter, and if necessary with the addition of a dispersing agent and/or alkali. The suspension is subjected to a careful wet milling and is subsequently freed, by post-classification, from all coarse fractions. Subsequently it is heated to a temperature of 60° C. and mixed, as the case may be, during intensive stirring with an aqueous sodium silicate solution and, after a certain additional stirring period, with an aqueous aluminum sulfate solution, whereupon stirring is still continued for some time. The suspension is thereafter brought to pH 5.0 by means of dilute ammonia or soda lye and then aqueous disodium hydrogen phosphate is added until the pH of the suspension has risen to 7.0. This procedure makes it generally certain that after the addition of the phosphate a sufficient amount of phosphate ions will be present for the precipitation of the subsequently added manganese. After the phosphate addition the suspension is again stirred for some time and the necessary amount of manganese is added in the form of an aqueous manganese (II) sulfate solution. After that the stirring is continued for a short time and, if necessary, the pH is corrected to 7.0 with dilute ammonia, soda lye or an alkaline orthophosphate solution. The pigment is then filtered off, thoroughly washed with de-ionized water, dried and milled.

Instead of aluminum sulfate, other water-soluble salts with aluminum as cation, e.g. aluminum chloride, may be used. However, water-soluble aluminates, e.g. sodium aluminate, may also be employed. If, in the latter case, i.e. when using an aluminate an alkaline suspension is obtained an acid should be added until the suspension has an acid reaction before the phosphate is added. The pH value of the suspension prior to the phosphate addition may deviate from 5.0, but in any event should preferably be in the slightly acid range. Instead of disodium hydrogen-phosphate, other water-soluble orthophosphates or orthophosphoric acid may be used. The type and amount of phosphate compound added depend on the pH value of the suspension, the amount of manganese salt to be added and, as the case may be, other post-treatment substances. Instead of manganese (II) sulfate other water-soluble manganese (II) salts as, for example, manganese (II) chloride manganese (II) acetate, etc. may be employed.

Under certain conditions it has been found that when the entire amount of manganese salt employed in the post-treatment is precipitated on the pigment at the outset a small portion of the precipitated manganese may be removed in the further coarse of post-treatment before the manganese has been fixed by drying as manganese (II) phosphate on the pigment. In such cases it is recommended that a small excess of manganese (II) salt be used in order to fix the desired amount of manganese (II) phosphate on the pigment. This excess depends on the conditions under which the post-treatment is carried out in detail and may be easily determined by experiments.

A certain influence on the characteristics of the titanium dioxide pigment produced according to the invention is exerted by the drying of the treated, filtered, and washed pigment. If the coated titanium dioxide pigment of this invention is dried in the manner customary in post-treatments i.e. by heating to temperatures far above 100° C. than under certain conditions, a definite discoloration of the pigment occurs. In order to avoid this, it is expedient to dry the treated, filtered and washed pigment under careful conditions and to this end the drying should be carried out at temperatures that do not essentially exceed 110° C. The duration of the drying depends on the drying temperature chosen and should be shorter, the higher the temperature used. In order to obtain quick drying it is advantageous to increase the surface of the drying material and/or to operate under reduced pressure. Thus, it is particularly favorable to carry out the drying in an atomizing dryer. On the other hand, it may also be carried out under reduced pressure i.e. in a vacuum drying plant. By means of this careful drying process, coated titanium dioxide pigment with very good brightness and without a brownish discoloration are obtained.

The following examples serve to illustrate the process and the improvements obtained:

EXAMPLE 1

Anatase pigment was slurried in deionized water. The suspension was freed from all coarse particles by wet milling in a ball mill and classification in a centrifuge. For post-treatment 1000 liters of this suspension (corresponding to 300 kg. TiO₂) were heated to 60° C. The following additions were made in the order given while continuously stirring and maintaining the temperature.

(1) 14.2 liters of a sodium metasilicate solution containing 190 g.p.l. SiO₂, corresponding to 0.9% SiO₂ on the basis of pigment used; after addition, stirring was continued for 30 minutes.

(2) A solution of 29.4 kg. Al₂(SO₄)₃18H₂O in 75 liters water, corresponding to 1.3% Al₂O₃ on the basis of pigment used, subsequently, stirring was continued for 30 minutes.

(3) Dilute ammonia solution to a pH of 5.0 after addition, stirring was continued for 30 minutes.

(4) Disodium hydrogen-phosphate solution with a concentration of 80 g.p.l. Na₂HPO₄ up to a pH of 7.0. About 80 liters of the disodium hydrogen-phosphate solution were required. Subsequently stirring was continued for 30 minutes.

(5) 12.5 liters of a manganese (II) sulfate solution with a content of 60 g.p.l. manganese corresponding to 0.25% Mn, on the basis of pigment used. Stirring was continued intensively for 15 minutes.

Subsequently the pH was determined. It had not been changed by the manganese sulfate addition so that no correction was required. The suspension was immediately filtered through a rotary filter and the pigment was repeatedly washed with deionized water and dried in an atomizing dryer wherein the temperature of the waste gas was 110° C. at maximum. The pigment was subsequently finely milled in a jet mill.

EXAMPLE 2

Anatase pigment was, as described in Example 1, slurried with water, wet milled and classified. 1000 liters of the suspension produced were mixed, as described in Example 1, with sodium metasilicate solution, aluminum sulfate solution and the pH of the suspension adjusted with dilute ammonia up to a pH of 5.0. Then the following additions were made:

(1) 175 liters of a disodium hydrogen phosphate solution with a content of 80 g.p.l. Na₂HPO₄ per liter. The pH of the suspension increased to 7.5 during this addition. After the addition, stirring was continued for 30 minutes.

(2) 60 liters of a manganese (II) sulfate solution with a content of 60 g.p.l. Mn, corresponding to 1.2% Mn on the basis of the pigment used. Subsequently the suspension was stirred intensively for 15 minutes. The pH of the suspension decreased to ca. 5.8 with the addition of the manganese sulfate.

(3) Dilute soda lye was added to adjust the pH to 7.0.

Subsequently stirring was continued for 15 minutes and the suspension was filtered, as in Example 1, and the pigment repeatedly washed with deionized water and dried in a heated vacuum drying oven for 8 hours at 80–110° C. (measured in the drying pigment). The pigment was subsequently finely milled in a jet mill. Analysis showed that 0.9% manganese as manganese (II) phosphate, calculated on the weight of the TiO₂ had been fixed on the surface of the pigment.

EXAMPLE 3

In order to judge the stabilizing effect of the manganese (II) phosphate post-treatment a pigment coated only with silicic acid and hydrated aluminum oxide was made as follows:

The same anatase pigment as described in Examples 1 and 2 was slurried with water, wet milled, and classified, and the suspension mixed with sodium metasilicate solution and aluminum sulfate solution. The pH of the suspension was then brought up to pH 8.1 with dilute ammonia. After an additional stirring period of 30 minutes, the pH was checked—it had changed only very slightly. The suspension was filtered and the pigment washed with deionized water and dried in a heated drying oven for 15 hours at 120° C. The pigment was subsequently milled on a jet mill.

The pigments obtained according to Examples 1 and 3 were used, in a manner known as such, as de-lustering agents in the manufacture of nylon-6 fibers. The fibers were tested on a tensile test machine for their tensile strength. They were then spooled on cards and exposed under a xenon lamp in a testing device for measuring fastness to light for 14 days without interruption. Immediately after the exposure to light the tensile strength was measured again. A hundred times the ratio of tensile strength after exposure to tensile strength prior to exposure, (the so-called residual strength) was used for evaluating the fastness to light of the fibers and expressed according to a point scale from 1 to 10. Point 1 meant excellent residual strength and point 10 very poor residual strength.

In the first series of tests nylon-6 fibers which contained 1.8% of the pigment prepared according to Examples 1 and 3, respectively, were compared with each other (see Table 1, samples D and B respectfully). In addition, a nylon-6 fiber was tested (sample C) which also contained 1.8% pigment according to Example 1, but in which the same amount of manganese as was used in Example 1 was added in a known manner, i.e. not to the pigment but in the form of a solution of a manganese poly-phosphate complex to the caprolactam prior to polymerization. Also, a non-delustered nylon-6 fiber (sample A) was tested for comparison.

The results of the tests are recorded in Table 1.

TABLE 1

| Sample | Delustered with 1.8% pigment according to example | Post-treatment of pigment with | Addition compound of the Mn caprolactam (p.p.m.) | Evaluation of the residual strength |
|---|---|---|---|---|
| A | | | | 6 |
| B | 3 | 0.9% SiO₂, 1.5% Al₂O₃ | | 7 |
| C | 3 | 0.9% SiO₂, 1.5% Al₂O₃ | 45 | 3 |
| D | 1 | 0.9% SiO₂, 1.5% Al₂O₃, 0.25% Mn (as manganese (II) phosphate). | | 1–2 |

The data recorded in Table 1 point to the following conclusions: By delustering a nylon-6 fiber with an anataste pigment which is coated solely, in a manner known as such, with silicic acid and hydrated aluminum oxide (sample B), an impairment of the fastness to light, which was mediocre to begin with (sample A) takes place. By the separate addition of manganese to the caprolactam prior to polymerization, the fastness to light is improved (sample C) but here difficulties occur by the separate dosing of the manganese compound and by agglomeration in the pigment dispersion. However, by employing anatase pigment post-treated with manganese II phosphate according to the invention (sample D) not only are the last-named difficulties avoided but also an additional marked improvement in the fastness to light is achieved.

In a second series of tests nylon-6 fibers were compared with each other which contained 0.3% of the pigments prepared according to Example 2 and Example 3, respectively (see Table II, samples H and F respectively). For comparison a nylon-6 fiber (sample G) was tested which also contained 0.3% pigment and about the same amount of manganese as was used in preparing sample H except that it was added not to the pigment but in the form of a solution of a manganese polyphosphate complex to the Caprolactam prior to polymerization; further-more, a non-delustered fiber was tested for comparison (sample E). The results are shown in Table 2.

TABLE 2

| Sample | Delustered with 0.3% pigment according to example | Post-treatment of pigment with | Addition of the Mn compound to caprolactam (p.p.m.) | Evaluation of the residual strength |
|---|---|---|---|---|
| E | | | | 6 |
| F | 3 | 0.9% SiO$_2$, 1.5% Al$_2$O$_3$ | | 7 |
| G | 3 | 0.9% SiO$_2$, 1.5% Al$_2$O$_3$ | 30 | 2 |
| H | 2 | 0.9% SiO$_2$, 1.5% Al$_2$O$_3$, 0.9% Mn (as manganese (II) phosphate). | | 1-2 |

Here also substantially the same results were obtained as in the first series of tests. By delustering a synthetic fiber with TiO$_2$ pigment which has only been coated with silicic acid and hydrated aluminum oxide, some improvement in the fastness to light of the fiber occurs (compare sample F with sample E). Moreover, the separate addition of a manganese compound to the caprolactam (sample G) prior to polymerization effects some increase of the fastness to light but in this case the disadvantages accompanying the separate addition of manganese must be taken into consideration. If, on the other hand, TiO$_2$ pigment post-treated with mananese (II) phosphate according to the invention is used as a delusterant, not only are the disadvantages connected with the separate addition of the mangenese salt avoided but in addition the fastness to light of the nylon-6 fiber is markedly improved (sample H).

What is claimed is:

1. Process for producing a manganese orthophosphate coated TiO$_2$ pigment suitable for use as a delusterant in polyamide fibers comprising the steps of:
    (a) preparing an aqueous slurry of calcined TiO$_2$;
    (b) heating said slurry and subjecting the calcined TiO$_2$ therein to a single post-calcination treatment by adding to said slurry in sequence:
        (1) water-soluble sodium metasilicate in an amount from 0.5 to 1.0% calculated as SiO$_2$;
        (2) water-soluble aluminum sulfate in an amount from 0.5 to 2.0% calculated as Al$_2$O$_3$;
        (3) water-soluble disodium hydrogen-phosphate in an amount to adjust the pH of the slurry to about 7.0; and
        (4) water-soluble manganese (II) sulfate in an amount from 0.05 to 2.0% calculated as Mn;
    (c) adjusting the pH of the slurry if necessary to precipitate said water soluble compounds as the corresponding hydrous silica, hydrous alumina and manganese orthophosphate on said calcined TiO$_2$ pigment;
    (d) filtering the slurry to recover the manganese orthophosphate coated TiO$_2$ pigment; and
    (e) drying the coated TiO$_2$ pigment by heating to a temperature not exceeding 110° C.

2. Process for producing a manganese orthophosphate coated TiO$_2$ pigment suitable for use as a delusterant in polyamide fibers comprising the steps of:
    (a) preparing an aqueous slurry of calcined TiO$_2$;
    (b) heating said slurry and subjecting the calcined TiO$_2$ therein to a single post-calcination treatment by adding to said slurry in sequence:
        (1) water-soluble sodium metasilicate in an amount of 0.9% calculated as SiO$_2$,
        (2) water soluble aluminum sulfate in an amount of 1.5% calculated as Al$_2$O$_3$,
        (3) dilute ammonia solution in amount to adjust the pH of said slurry to about 5.0,
        (4) water-soluble disodium hydrogen-phosphate in an amount to raise the pH of the slurry to about 7.0; and
        (5) water-soluble manganese (II) sulfate in an amount of from 0.25 to 1.2% calculated as Mn,
    (c) adjusting the pH of the slurry if necessary to precipitate said water soluble compounds as the corresponding hydrous alumina, hydrous silica and manganese orthophosphate on said calcined TiO$_2$ pigment,
    (d) filtering the slurry to recover the manganese orthophosphate coated TiO$_2$ pigment; and
    (e) drying the coated TiO$_2$ pigment by heating to a temperature not exceeing 110° C.

3. Process for producing a coated TiO$_2$ pigment according to claim 2 wherein the water soluble sodium silicate and the aluminum sulfate are added to the slurry first followed by the addition of the neutralizing agent in an amount to at least partially neutralize the slurry and precipitate the corresponding hydrous alumina and silica on the pigment, thereafter adding the phosphorus compound and finally the manganese (II) compound to precipitate the manganese orthophosphate.

4. Process for producing a coated TiO$_2$ pigment according to claim 2 wherein the treated and washed TiO$_2$ pigment is dried in an atomizing dryer.

5. Process for producing a coated TiO$_2$ pigment according to claim 2 wherein the treated and washed TiO$_2$ pigment is dried under reduced pressure.

6. A coated TiO$_2$ pigment suitable for use as a delusterant in polyamide fibers comprising TiO$_2$ having thereon a single post-calcination coating comprising from 0.5 to 2.0% alumina calculated as Al$_2$O$_3$ and from 0.5 to 1.0% silica calculated as SiO$_2$ in combination with from 0.05 to 2.0% manganese orthophosphate calculated as Mn.

7. A coated TiO$_2$ pigment according to claim 6 wherein the amount of alumina, as Al$_2$O$_3$, is 1.5% the amount of silica, as SiO$_2$, is 0.9% and the amount of manganese orthophosphate calculated as Mn is in the range of from 0.25 to 1.2% the amount of each coating agent being on a TiO$_2$ weight basis.

References Cited

UNITED STATES PATENTS

| 2,150,235 | 3/1939 | McKinney | 106—300 |
| 2,251,870 | 8/1941 | Gamble et al. | |
| 2,260,871 | 10/1941 | Sawyer. | |
| 2,668,776 | 2/1954 | Miller. | |
| 3,127,280 | 3/1964 | Whately. | |
| 3,251,705 | 5/1966 | Rieck et al. | 106—300 |
| 3,330,798 | 7/1967 | Deissmann et al. | 106—300 XR |
| 3,342,617 | 9/1967 | Jackson. | |

OTHER REFERENCES

Chemical Abstracts, vol. 55, p. 6926B (1961).
Chemical Abstracts, vol. 62, p. 6616F (1965).

JAMES E. POER, Primary Examiner

H. M. S. SNEED, Assistant Examiner

U.S. Cl. X.R.
106—300; 260—37